United States Patent [19]
Payne

[11] Patent Number: 6,079,517
[45] Date of Patent: Jun. 27, 2000

[54] POWER DRIVEN TREE STAND

[76] Inventor: Robert W. Payne, 5512 60th Way N., St., St. Petersburg, Fla. 33709

[21] Appl. No.: 09/406,521

[22] Filed: Sep. 28, 1999

[51] Int. Cl.7 ....................................................... A45F 3/26
[52] U.S. Cl. .......................... 182/187; 182/188; 182/133; 182/142
[58] Field of Search .................................... 182/133, 187, 182/188, 142

[56] References Cited

U.S. PATENT DOCUMENTS

| 860,359 | 7/1907 | Dudley | 182/133 |
| 929,034 | 7/1909 | Skelly | 182/223 |
| 2,654,638 | 10/1953 | Elliott | 182/133 |
| 3,568,797 | 3/1971 | Hardy | 182/142 |
| 3,727,723 | 4/1973 | Pitcairn | 182/133 |
| 4,134,474 | 1/1979 | Stavenau | 182/187 |
| 4,593,789 | 6/1986 | Treants | 182/187 |
| 5,267,632 | 12/1993 | Mintz | 182/187 |
| 5,647,454 | 7/1997 | Fehr | 182/133 |

FOREIGN PATENT DOCUMENTS

| 537424 | 11/1931 | Germany | 182/133 |

*Primary Examiner*—Alvin Chin-Shue

[57] ABSTRACT

A power driven tree stand including an elevator assembly having a pair of parallel primary rails and a pair of parallel secondary rails. A primary axle couples the primary rails and a secondary axle couples the secondary rails. A pair of primary tires are rotatably received on the primary axle. A pair of secondary tires are rotatably received on the secondary axle. A pair of parallel support rails have free first ends and second ends pivotably coupled by pins to the exterior ends of the primary rails and a plurality of tubular cross bars there between for receiving a wheelchair thereupon.

8 Claims, 5 Drawing Sheets

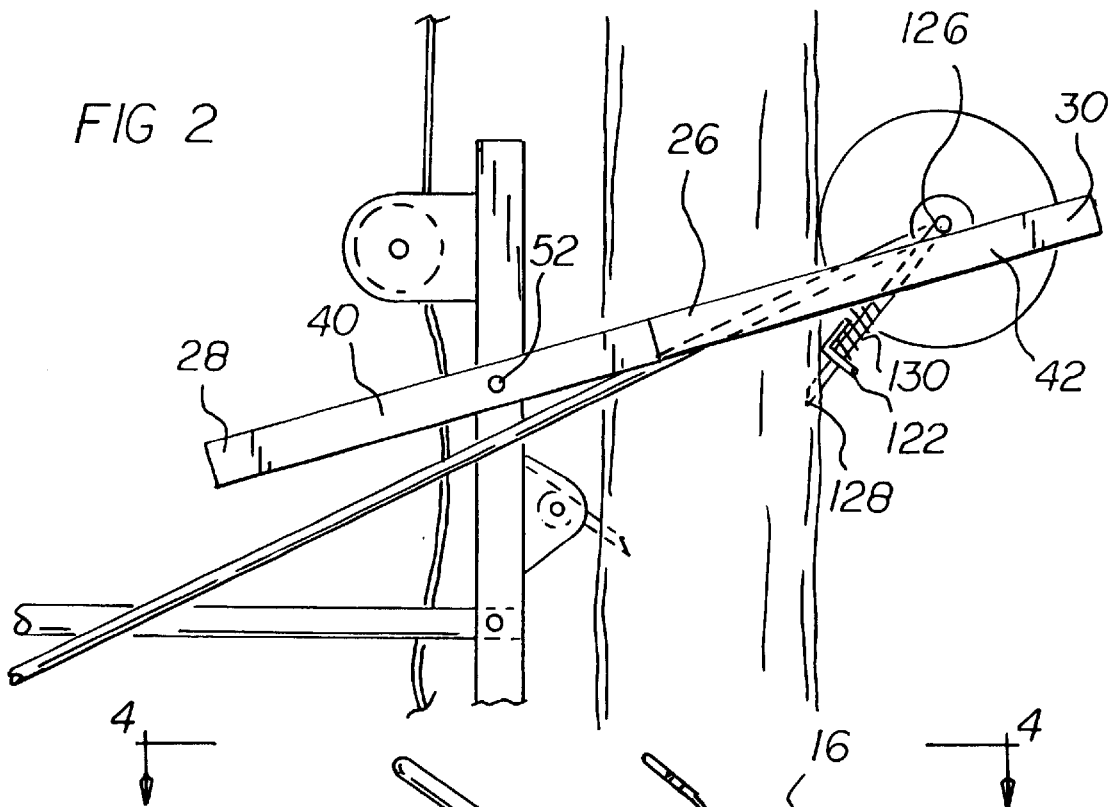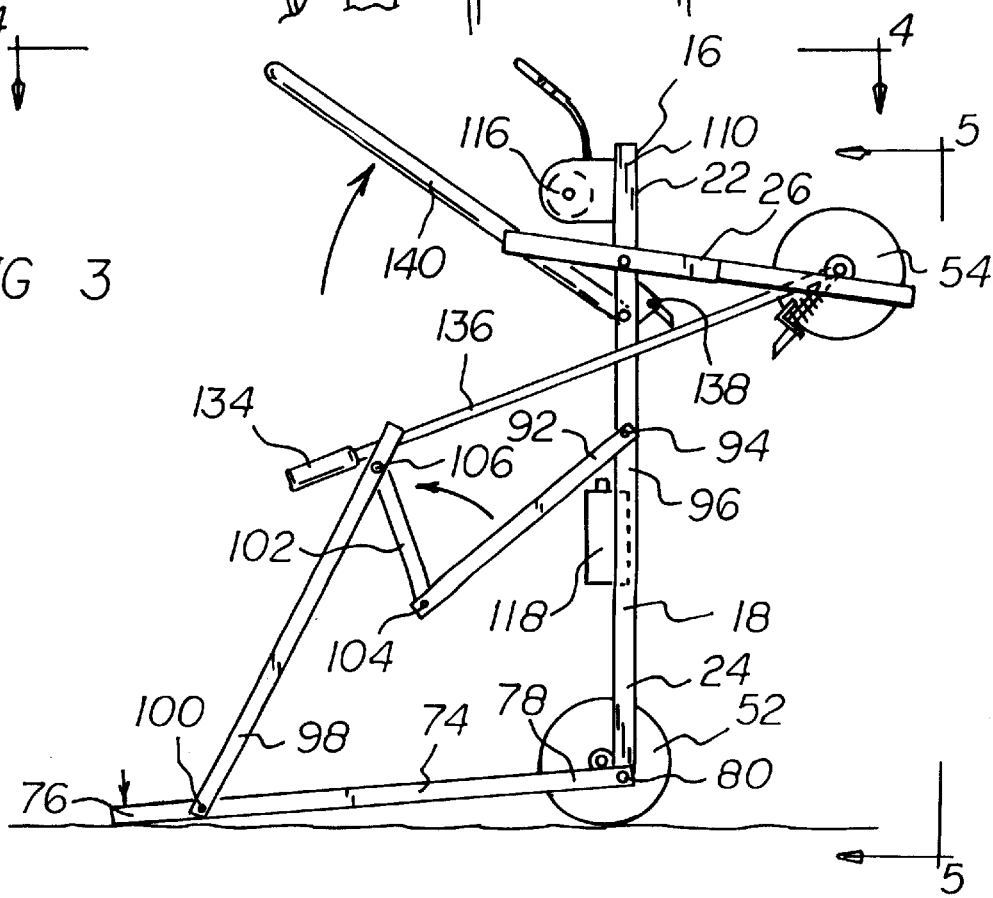

POWER DRIVEN TREE STAND

BACKGROUND OF THE INVENTION

1. Field of the Invention

The present invention relates to a power driven tree stand and more particularly pertains to automatically controlling a power driven tree stand by a user such as a person in a wheelchair.

2. Description of the Prior Art

The use of tree stands of other designs and configurations is known in the prior art. More specifically, tree stands of other designs and configurations heretofore devised and utilized for the purpose of operating tree stands through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,688,657 to Erickson discloses a portable elevating device. U.S. Pat No. 5,009,284 to Authement discloses a chair lift apparatus. U.S. Pat. No. 4,602,698 to Grant discloses a hunting chair. U.S. Pat. No. 4,811,803 to Green discloses a deer stand. Lastly, U.S. Pat. No. 5,779,002 to Paton et al. discloses an astronaut's work station device.

While these devices fulfill their respective, particular objectives and requirements, the aforementioned patents do not describe a power driven tree stand that allows automatically controlling a power driven tree stand by a user such as a person in a wheelchair.

In this respect, the power driven tree stand according to the present invention substantially departs from the conventional concepts and designs of the prior art, and in doing so provides an apparatus primarily developed for the purpose of automatically controlling a power driven tree stand by a user such as a person in a wheelchair.

Therefore, it can be appreciated that there exists a continuing need for a new and improved power driven tree stand which can be used for automatically controlling a power driven tree stand by a user such as a person in a wheelchair. In this regard, the present invention substantially fulfills this need.

SUMMARY OF THE INVENTION

In view of the foregoing disadvantages inherent in the known types of tree stands of other designs and configurations now present in the prior art, the present invention provides an improved power driven tree stand. As such, the general purpose of the present invention, which will be described subsequently in greater detail, is to provide a new and improved power driven tree stand and method which has all the advantages of the prior art and none of the disadvantages.

To attain this, the present invention essentially comprises a new and improved power driven tree stand system automatically controlled by a user, such as a person in a wheelchair. An elevator assembly is first provided. The elevator assembly has a pair of parallel primary rails with interior ends and exterior ends. The elevator assembly also has a pair of parallel secondary rails with interior ends and exterior ends. A pair of pivot pins are provided and couple the primary rails and secondary rails adjacent to their interior ends. A primary axle is provided and couples the exterior ends of the primary rails. A secondary axle is provided and couples the exterior ends of the secondary rails. The secondary rails are formed of two separate sections. A bolt with a nut is provided on one section and a hinge on the other section to allow the coupling and uncoupling of the secondary rails to permit the elevator assembly to encompass a tree. A pair of primary tires are next provided. The primary tires are rotatably received on the primary axle. A pair of secondary tires are also provided and are rotatably received on the secondary axle. Short internal spacers of a tubular configuration with an axial slit are removably positionable over the axles between the tires and external spacers of a tubular configuration with an axial slit are removably positionable over the axles between the tires and the rails. In this manner the tires are held in closely spaced relationship during operation and use. Elongated spacers of a tubular configuration with an axial slit removably positionable over the axles are next provided. The elongated spacers function to hold the tires adjacent to the rails when transporting the system from one location to another. A pair of parallel support rails are next provided. The support rails have free first ends and second ends pivotably coupled by pins to the exterior ends of the primary rails. A plurality of tubular cross bars are provided between the support rails for receiving a wheelchair thereupon. A pair of parallel angled rails are next provided. The angled rails are formed of separable sections. The separable sections have top ends pivotably coupled by pins to intermediate regions of the primary rails. The separable sections also have bottom ends pivotably coupled by pins adjacent to the first ends of the support rails. An intermediate component of the separable sections is pivotably coupled by pins to the separable sections remote from their top and bottom ends to allow movement of the separable sections between an in-line orientation during operation and use and a separated orientation during movement of a wheelchair to and from the support rails. A top rail is provided. The top rail couples the interior ends of the primary rails with a winch. A motor is provided for rotating the winch. A battery is provided there adjacent for energizing the motor. A control box is also provided for operatively coupling to the motor. The control box is under the control of a user who may thereby selectively power the winch to raise and lower the elevator assembly along a tree. A locking pin is next provided. The locking pin has a support end pivotably mounted on the secondary axle. A pointed free end of the locking pin is adapted to penetrate a tree when the elevator assembly is in a raised orientation for securement purpose. A spring is provided for urging the free end into a tree. The locking pin has a support end. The support end includes a handle. The handle has a forward end under the control of an operator for rotating the pin for engaging and disengaging the tree. A U-shaped guard is next provided. The U-shaped guard has free ends pivotably coupled by pins to an upper extent of the primary rails to secure the user and wheelchair in position. A short cable and a cable positioning member are next provided. The cable positioning member includes a C-shaped upper component. The upper component is provided with a plurality of resilient fingers for releasably supporting the short cable configured in a major loop around a tree. The short cable has free ends each with a minor loop. One end of the short cable extends through the first minor loop at the other end. A long cable is provided and is coupled between the winch and a minor loop of a short cable. The cable positioning mechanism also includes a long rod for elevating the upper component and short cable to an intended height prior to energizing the winch and raising the elevator assembly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved power driven tree stand which has all of the advantages of the prior art xother and none of the disadvantages.

It is another object of the present invention to provide a new and improved power driven tree stand which may be easily and efficiently manufactured and marketed.

It is further object of the present invention to provide a new and improved power driven tree stand which is of durable and reliable constructions.

An even further object of the present invention is to provide a new and improved power driven tree stand which is susceptible of a low cost of manufacture with regard to both materials and labor, and which accordingly is then susceptible of low prices of sale to the consuming public, thereby making such power driven tree stand economically available to the buying public.

Even still another object of the present invention is to provide a power driven tree stand for automatically controlling a power driven tree stand by a user such as a person in a wheelchair.

Lastly, it is an object of the present invention to provide a new and improved power driven tree stand including an elevator assembly having a pair of parallel primary rails and a pair of parallel secondary rails, a primary axle coupling the primary rails, a secondary axle coupling the secondary rails, a pair of primary tires rotatably received on the primary axle, a pair of secondary tires rotatably received on the secondary axle, a pair of parallel support rails having free first ends and second ends pivotably coupled by pins to the exterior ends of the primary rails, and a plurality of tubular cross bars there between for receiving a wheelchair thereupon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an enlarged side elevational view taken at the circle region of FIG. 1.

FIG. 3 is a side elevational view of the elevator assembly portion of the tree stand shown in FIG. 1 but in a partically collapsed orientation.

The same reference numerals refer to the same parts through the various Figures.

DESCRIPTION OF THE PREFERRED EMBODIMENT

Figure 1:
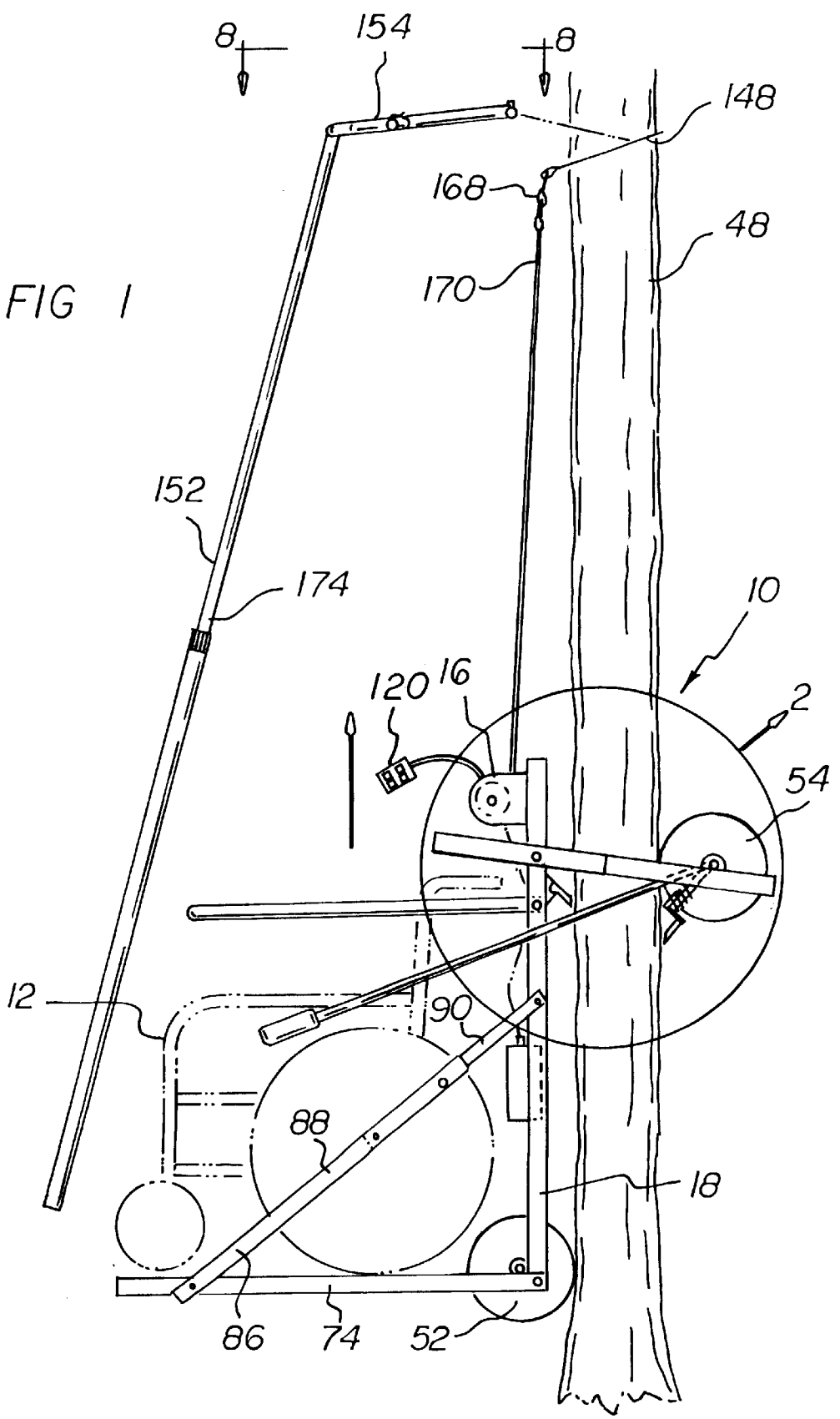
FIG. 1 is a side elevational view of the new and improved power driven tree stand system constructed in accordance with the principles of the present invention.
Figure 4:
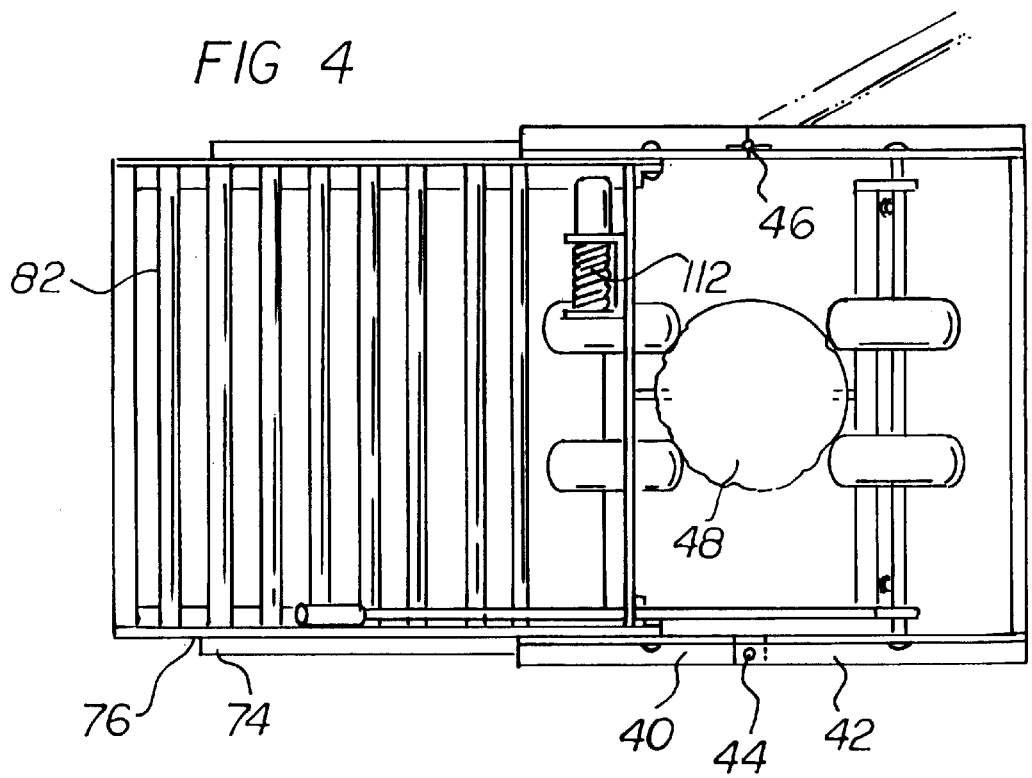
FIG. 4 is a top elevational view taken along line 4—4 of FIG. 3.
Figure 5:
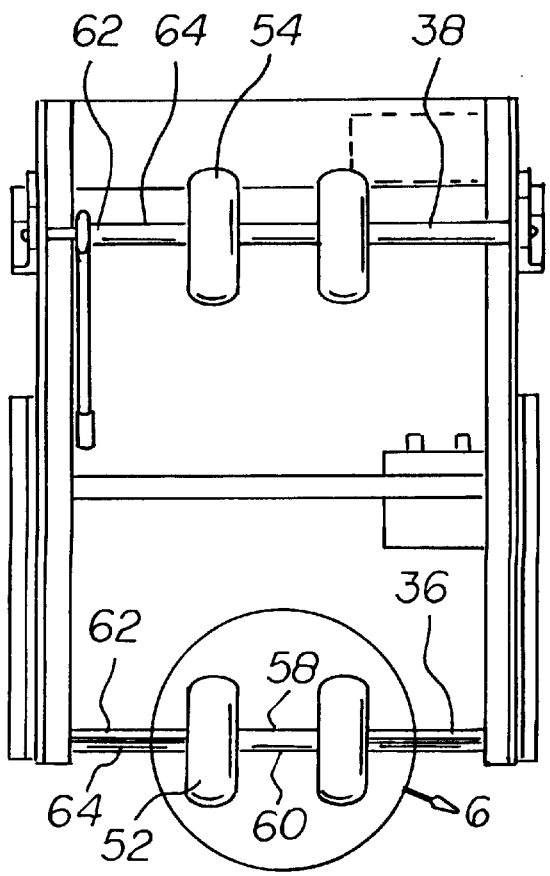
FIG. 5 is an end elevational view taken along line 5—5 of FIG. 3.
Figure 6:
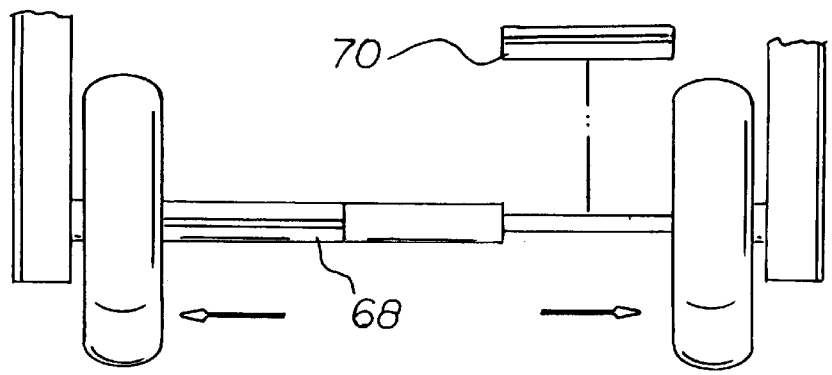
FIG. 6 is an exploded perspective view of one of the axles and its wheels.
Figure 7:
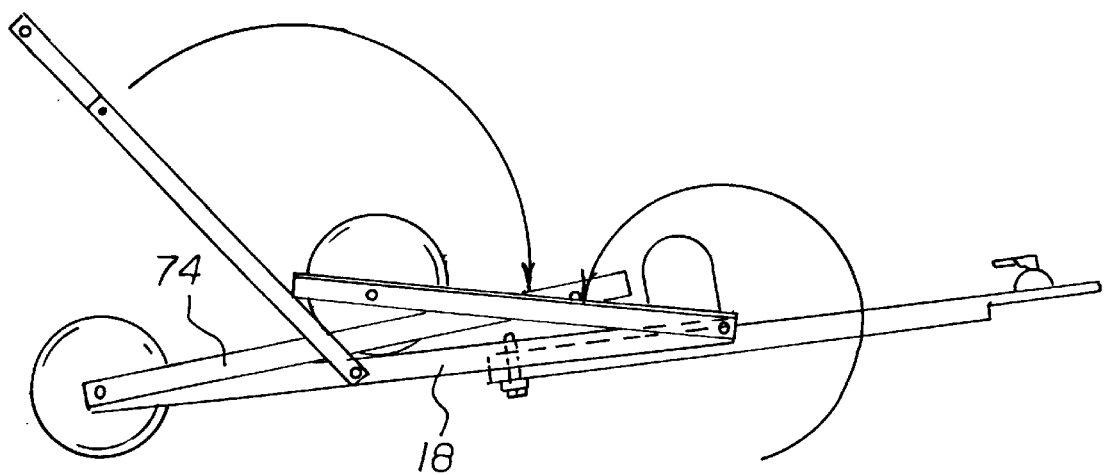
FIG. 7 is a side elevational view similar to FIG. 3 but showing the elevator assembly in a collapsed orientation.
Figure 8:
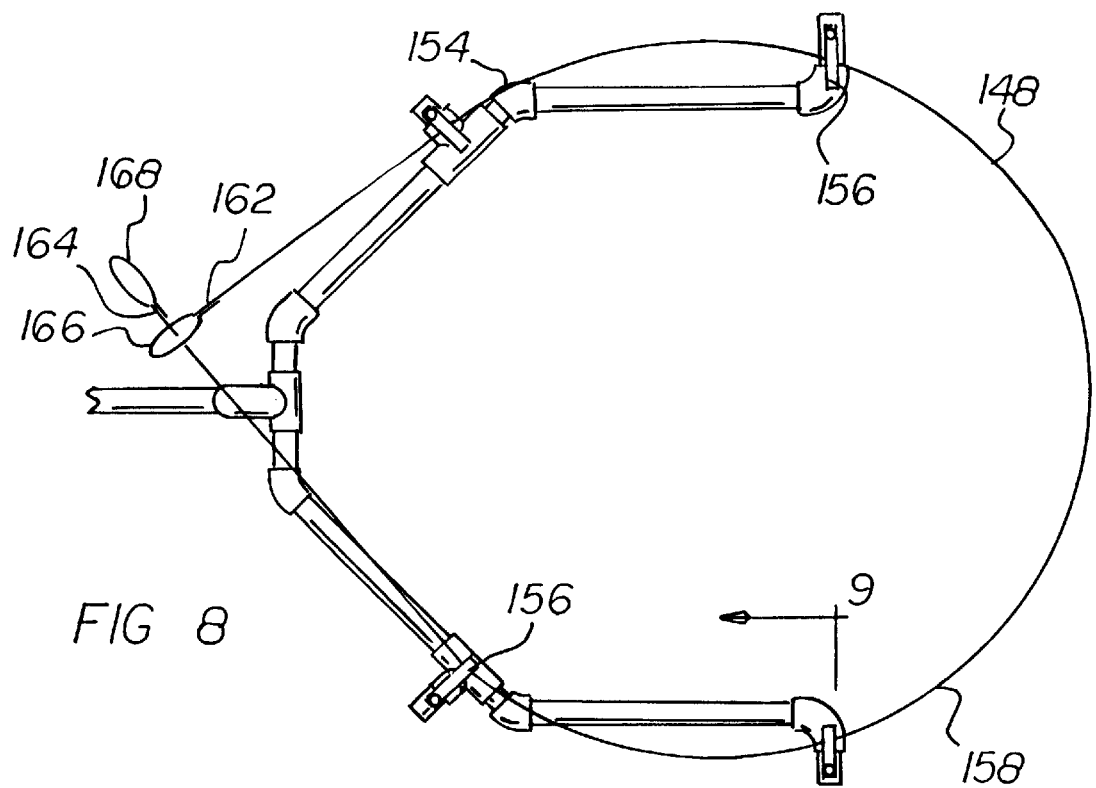
FIG. 8 is a top elevational view taken along line 8—8 of FIG. 1.
Figure 9:
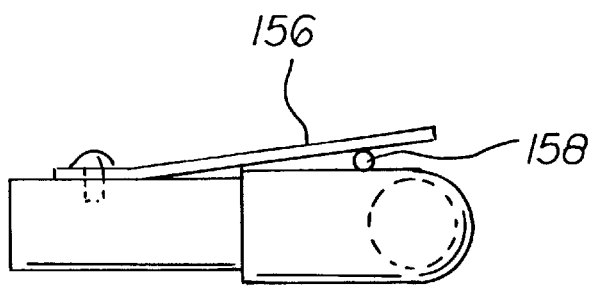
FIG. 9 is a cross sectional view taken along line 9—9 of FIG. 8.

With reference now to the drawings, and in particular to FIG. 1 thereof, the preferred embodiment of the new and improved power driven tree stand embodying the principles and concepts of the present invention and generally designated by the reference numeral 10 will be described.

The present invention, the power driven tree stand 10 automatically controlled by a user, such as a person in a wheelchair 12 is comprised of a plurality of components. Such components in their broadest context include an elevator assembly 16, a pair of primary tires 52, a pair of secondary tires 54, and a pair of support rails 74. Such components are individually configured and correlated with respect to each other so as to attain the desired objective.

An elevator assembly 16 is first provided. The elevator assembly has a pair of parallel primary rails 18 with interior ends 22 and exterior ends 24. The elevator assembly also has a pair of parallel secondary rails 26 with interior ends 28 and exterior ends 30. A pair of pivot pins 52 are provided and couple the primary rails and secondary rails adjacent to their interior ends. A primary axle 36 is provided and couples the exterior ends of the primary rails. A secondary axle 38 is provided and couples the exterior ends of the secondary rails. The secondary rails are formed of two separate sections 40, 42. Alos provided are a bolt 44 with a nut on one section and a hinge 46 on the other section to allow the coupling and uncoupling of the secondary rails to permit the elevator assembly to encompass a tree 48.

A pair of primary tires 52 are next provided. The primary tires are rotatably received on the primary axle. A pair of secondary tires 54 are also provided and are rotatably received on the secondary axle. Short internal spacers 58 of a tubular configuration with an axial slit 60 are removably positionable over the axles between the tires and external spacers 62 of a tubular configuration with an axial slit 64 are removably positionable over the axles between the tires and the rails. In this manner the tires are held in closely spaced relationship during operation and use. Elongated spacers 68 of a tubular configuration with an axial slit 70 removably positionable over the axles are next provided. The elongated spacers function to hold the tires adjacent to the rails when transporting the system from one location to another.

A pair of parallel support rails 74 are next provided. The support rails have free first ends 76 and second ends 78 pivotably coupled by pins 80 to the exterior ends of the primary rails. A plurality of tubular cross bars 82 are provided between the support rails for receiving a wheelchair thereupon.

A pair of parallel angled rails 86 are next provided. The angled rails are formed of separable sections 88, 90. The separable sections have top ends 92 pivotably coupled by pins 94 to intermediate regions 96 of the primary rails. The separable sections also have bottom ends 98 pivotably coupled by pins 100 adjacent to the first ends of the support rails. An intermediate component 102 of the separable sections is pivotably coupled by pins 104, 106 to the separable sections remote from their top and bottom ends to allow movement of the separable sections between an in-line orientation during operation and use and a separated orientation during movement of a wheelchair to and from the support rails.

A top rail 110 is provided. The top rail couples the interior ends of the primary rails with a winch 112. A motor 116 is provided for rotating the winch. A battery 118 is provided there adjacent for energizing the motor. A control box 120 is also provided for operatively coupling to the motor. The control box is under the control of a user who may thereby selectively power the winch to raise and lower the elevator assembly along a tree.

A locking pin 122 is next provided. The locking pin has a support end 126 pivotably mounted on the secondary axle. A pointed free end 128 of the locking pin is adapted to penetrate a tree when the elevator assembly is in a raised orientation for securement purpose. A spring 130 is provided for urging the free end into a tree. The locking pin has a support end. The support end includes a handle 134. The handle has a forward end 136 under the control of an operator for rotating the pin for engaging and disengaging the tree. An additional pin 138, facing oppositely from the locking pin 122, may also be utilized.

A U-shaped guard 140 is next provided. The U-shaped guard has free ends pivotably coupled by pins to an upper extent of the primary rails to secure the user and wheelchair in position.

A short cable 148 and a cable positioning member 152 are next provided. The cable positioning member includes a C-shaped upper component 154. The upper component is provided with a plurality of resilient fingers 156 for releasably supporting the short cable configured in a major loop 158 around a tree. The short cable has free ends 162, 164 each with a-minor loop 166, 168. One end of the short cable extends through the first minor loop 166 at the other end 164. A long cable 170 is provided and is coupled between the winch and a minor loop 168 of a short cable. The cable positioning mechanism also includes a long rod 174 for elevating the upper component and short cable to an intended height prior to energizing the winch and raising the elevator assembly.

Individuals with disabilities have special needs and limitations and the number of disabled hunters is increasing. The increase is attributable to the availability of adaptive hunting equipment, sportsmen's organizations and programs that provide hunting opportunities for disabled hunters. Permanent stands must be located where enough game frequent the area to warrant their use. The present invention is transportable to different locations. The present invention can help those who have had a disability for years as well as those new to the challenge to regain the passion of hunting.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A power driven tree stand system automatically controlled by a user, such as a person in a wheelchair, comprising, in combination:

an elevator assembly having a pair of parallel primary rails with interior ends and exterior ends and a pair of parallel secondary rails with interior ends and exterior ends, a pair of pivot pins coupling the primary rails and secondary rails adjacent to their interior ends, a primary axle coupling the exterior ends of the primary rails and a secondary axle coupling the exterior ends of the secondary rails, the secondary rails being formed of two separate sections with a bolt and nut on one section and a hinge on the other section to allow their coupling and uncoupling to permit the elevator assembly to encompass a tree;

a pair of primary tires rotatably received on the primary axle and a pair of secondary tires rotatably received on the secondary axle, short internal spacers of a tubular configuration with an axial slit removably positionable over the axles between the tires with external spacers of a tubular configuration with an axial slit removably positionable over the axles between the tires and the rails to thereby hold the tires in closely spaced relationship during operation and use, elongated spacers of a tubular configuration with an axial slit removably positionable over the axles to hold the tires adjacent to the rails when transporting the system from one location to another;

a pair of parallel support rails having free first ends and second ends pivotably coupled by pins to the exterior ends of the primary rails and a plurality of tubular cross bars there between for receiving a wheelchair thereupon;

a pair of parallel angled rails formed of separable sections having top ends pivotably coupled by pins to intermediate regions of the primary rails and bottom ends pivotably coupled by pins adjacent to the first ends of the support rails and with an intermediate component pivotably coupled by pins to the separable sections remote from their top and bottom ends to allow movement of the separable sections between an in-line orientation during operation and use and a separated orientation during movement of a wheelchair to and from the support rails;

a top rail coupling the interior ends of the primary rails with a winch and motor for rotating the winch and a battery there adjacent for energizing the motor with a control box under the control of a user for operatively coupling to the motor to thereby selectively power the winch to raise and lower the elevator assembly along a tree;

a locking pin having a support end pivotably mounted on the secondary axle and a pointed free end adapted to penetrate a tree when the elevator assembly is in a raised orientation for securement purpose and a spring adapted to urge the free end into a tree, the support end of the locking pin including a handle with a forward end adapted to be under the control of an operator for rotating the pin for engaging and disengaging a tree;

a U-shaped guard having free ends pivotably coupled by pins to an upper extent of the primary rails to secure the user and wheelchair in position;

a short cable and a cable positioning member including a C-shaped upper component with a plurality of resilient fingers for releasably supporting the short cable configured in a major loop around a tree, the short cable having a first fee end with a first minor loop and a second free end with a second minor loop, the second free end of the short cable extending through the first minor loop and also including a long cable coupled between the winch and the second minor loop of the short cable; and a cable positioning mechanism also including a long rod for elevating the upper component and short cable to an intended height prior to energizing the winch and raising the elevator assembly.

2. A power driven tree stand system comprising an elevator assembly having a pair of parallel primary rails having interior ends and exterior ends and a pair of parallel secondary rails, a primary axle coupling the primary rails and a secondary axle coupling the secondary rails, a pair of primary tires rotatably received on the primary axle and a pair of secondary tires rotatably received on the secondary axle, and a pair of parallel support rails having free first ends and second ends pivotably coupled by pins to the exterior ends of the primary rails and a plurality of tubular cross bars there between for receiving a wheelchair thereupon, and further including first spacers removably positionable over the axles between the tires with second spacers removably positionable over the axles between the tires and the rails to thereby hold the tires in closely spaced relationship during operation and use and additional spacers removably positionable over the axles to hold the tires adjacent to the rails when transportation the system from one location to another.

3. The system as set forth in claim 2 and further including a pair of parallel angled rails formed of separable sections having top ends pivotably coupled by pins to intermediate regions of the primary rails and bottom ends pivotably coupled by pins adjacent to the first ends of the support rails and with an intermediate component pivotably coupled by pins to the separable sections remote from their top and bottom ends to allow movement of the separable sections between an in-line orientation during operation and use and a separated orientation during movement of a wheelchair to and from the support rails.

4. The system as set forth in claim 2 and further including a top rail coupling the interior ends of the primary rails with a winch and motor for rotating the winch and a battery there adjacent for energizing the motor with a control box under the control of a user for operatively coupling to the motor to thereby selectively power the winch to raise and lower the elevator assembly along a tree.

5. The system as set forth in claim 2 and further including a locking pin having a support end pivotably mounted on the secondary axle and a pointed free end adapted to penetrate a tree when the elevator assembly is in a raised orientation for securement purpose and a spring adapted to urge the free end into a tree, the support end of the locking pin including a handle with a forward end adapted to be under the control of an operator for rotating the pine for engaging and disengaging a tree.

6. The system as set forth in claim 2 and further including a U-shaped guard having free ends pivotably coupled by pins to an upper extent of the primary rails to secure the user and wheelchair in position.

7. A power driven tree stand system comprising an elevator assembly having a pair of parallel primary rails having interior ends and exterior ends and a pair of parallel secondary rails, a primary axle coupling the primary rails and a secondary axle coupling the secondary rails, a pair of primary tires rotatably received on the primary axle and a pair of secondary tires rotatably received on the secondary axle, and a pair of parallel support rails having free first ends and second ends pivotably coupled by pins to the exterior ends of the primary rails and a plurality of tubular cross bars there between for receiving a wheelchair thereupon, and further including short internal first spacers of a tubular configuration with an axial slit removably positionable over the axles between the tires with external second spacers of a tubular configuration with an axial slit removably positionable over the axles between the tires and the rails to thereby hold the tires in closely spaced relationship during operation and use and elongated spacers of a tubular configuration with an axial slit removably positionable over the axles to hold the tires adjacent to the rails when transporting the system from one location to another.

8. A Power driven tree stand system comprising an elevator assembly having a pair of parallel primary rails having interior ends and exterior ends and a pair of parallel secondary rails, a primary axle coupling the primary rails and a secondary axle coupling the secondary rails, a pair of primary tires rotatable received on the primary axle and a pair of secondary tires rotatable received on the secondary axle, and a pair of parallel support rails having free first ends and second ends pivotably coupled by pins to the exterior ends of the primary rails and a plurality of tubular cross bars there between for receiving a wheelchair thereupon, and further including a short cable and a cable positioning member including a C-shaped upper component with a plurality of resilient fingers for releasably supporting the short cable configured in a major loop around a tree, the short cable having free ends each with a minor loop, one end of the short cable extending through the first minor loop at the other end and also including a long cable coupled between the winch and a minor loop of a short cable, the cable positioning mechanism also including a long rod for elevating the upper component and short cable to an intended height prior to energizing the winch and raising the elevator assembly.

* * * * *